United States Patent
Golley et al.

[19]
[11] Patent Number: 5,965,103
[45] Date of Patent: Oct. 12, 1999

[54] PRODUCTION OF SLAKED LIME

[75] Inventors: Christopher Robin Langdon Golley, Sandersville, Ga.; Jacek Antoni Kostuch; John Anthony Purdey, both of Cornwall, United Kingdom

[73] Assignee: ECC International Ltd., United Kingdom

[21] Appl. No.: 08/993,758

[22] Filed: Dec. 18, 1997

[30] Foreign Application Priority Data

Dec. 20, 1996 [GB] United Kingdom ................... 9626557

[51] Int. Cl.[6] .............................. C01F 11/02; C01F 11/06
[52] U.S. Cl. ......................... 423/640; 423/155; 423/637
[58] Field of Search ................................. 423/165, 155, 423/636, 637, 640

[56] References Cited

U.S. PATENT DOCUMENTS

| | | | |
|---|---|---|---|
| 3,862,294 | 1/1975 | Engelhart et al. | 423/155 |
| 4,479,920 | 10/1984 | Dodson | 422/143 |
| 5,792,440 | 8/1998 | Huege | 423/640 |

*Primary Examiner*—Wayne Langel
*Attorney, Agent, or Firm*—Suzanne Kikel

[57] ABSTRACT

A method of producing an aqueous suspension of calcium hydroxide which comprises passing a gaseous flow incorporating particles of calcium carbonate through a calcining furnace thermally to decompose the calcium carbonate, delivering a flow of the decomposition products formed in the furnace comprising calcium oxide particles suspended in gas comprising carbon dioxide to a vessel wherein the calcium oxide particles are contacted with water to produce an aqueous suspension of calcium hydroxide and separating the aqueous suspension from the said gas.

15 Claims, 1 Drawing Sheet

PRODUCTION OF SLAKED LIME

BACKGROUND OF THE INVENTION

The present invention relates to the production of slaked lime.

Slaked lime, ie. an aqueous suspension of calcium hydroxide, is used in a variety of industrial applications. For example, a common use is in the production of precipitated calcium carbonate (pcc) by reaction with carbon dioxide.

Slaked lime is formed by reacting quicklime or calcium oxide with water. The quicklime is usually produced by thermally decomposing calcium carbonate, eg. obtained from a mineral source, such as limestone, in a furnace. Conventionally, the quicklime is obtained as a solid residue in the furnace. After cooling, the quicklime is usually handled dry, eg. packaged in bags or in bulk quantities which are stored and subsequently transported to a user. Alternatively, it may be conveyed dry directly to a user. Handling, storage and transport of dry quicklime produced in this conventional way presents problems because the quicklime is a hazardous alkaline material. Care has to be exercised to avoid accidental contact of the dry quicklime powder with water which affects properties of the product, eg. pcc, subsequently produced by use of the slaked lime obtained from the quicklime.

For pcc production, slaked lime is conventionally produced by mixing the quicklime with water in a vessel containing the water. If care is not taken when slaking conventionally produced quicklime, slaked lime produced in this way may be viscous even at relatively low solids levels and may contain grit arising from uncalcined calcium carbonate or from unreacted and water burned quicklime.

SUMMARY OF THE INVENTION

According to the present invention there is provided a method of producing an aqueous suspension of calcium hydroxide which comprises passing a gaseous flow incorporating particles of calcium carbonate through a calcining furnace thermally to decompose the calcium carbonate, delivering a flow of the decomposition products formed in the furnace comprising calcium oxide particles suspended in gas comprising carbon dioxide to a vessel wherein the calcium oxide particles are contacted with water to produce an aqueous suspension of calcium hydroxide and separating the aqueous suspension from the said gas.

DESCRIPTION OF THE INVENTION

A gaseous flow incorporating particles of calcium carbonate are passed through a calcining furnace to decompose the calcium carbonate and produce a gas comprising decomposition products and calcium oxide particles suspended therein. The said gas in which the calcium oxide is suspended may comprise a mixture of gases, eg. oxygen, nitrogen and water vapour as well as carbon dioxide produced by the decomposition reaction.

The gaseous suspension comprising the said flow of decomposition products is preferably cooled before being supplied to the said vessel so that no substantial re-absorption of the carbon dioxide by the calcium oxide occurs before the calcium oxide is contacted with water. Cooling also reduces the thermal load in the next stage in the said vessel as described below and may also provide a heat source to raise the temperature of the stream of exhaust gases and thereby limit condensation and formation of a plume when such gases are delivered to the outside atmosphere. Cooling may be carried out in a heat exchanger in which the gaseous suspension of calcium oxide is passed along a tube adjacent to a coolant fluid, ie. liquid or gas in an adjacent compartment, eg. an outer tube forming a jacket around the tube containing the said suspension. The coolant may be transferred to a corresponding heat exchanger or to provide a heat source in another stage of the process wherein the heat gained by the coolant is lost in that other stage. The coolant may comprise exhaust gases separated from the solid material later in the process as described hereinafter.

Preferably, the heat exchanger is a cross-flow tubular heat exchanger in which the coolant gas and gaseous suspension to be cooled flow in opposite directions.

The said gaseous suspension is preferably cooled by at least 80 Celsius degrees preferably by at least about 100 Celsius degrees prior to introduction to the said vessel.

The said vessel may comprise one of the type known as a scrubber wherein flowing water is contacted with the particles in the gaseous flow. The water may be in a spray. The vessel may be a scrubber of the known kind including a venturi throat which causes suction and swirling of the gaseous flow, the water being sprayed into the flow in or near to the venturi. This allows intimate contacting of the calcium oxide particles with water.

Desirably, in the said vessel the temperature and flow rate of added water relative to the gaseous suspension of calcium oxide is sufficient to reduce the temperature of the suspension below the boiling point of water, preferably below 90° C., to avoid drying and water burning of the calcium oxide particles.

The aqueous suspension formed in the said vessel may be passed mixed with gas into a second vessel in which it is further contacted with water to ensure full slaking of the calcium oxide particles. The second vessel may also comprise a scrubber, eg. similar to the first vessel, in which the first mixture being treated is contacted by a water-containing spray.

The water employed to contact the calcium oxide in the first and/or second vessel may comprise an aqueous suspension of calcium hydroxide already produced by the process and recirculated as an input to the appropriate vessel. Such suspension may have a temperature controlled as described hereinafter to avoid water burning of the calcium oxide in the slaking process and to give the required crystal morphology if the suspension is subsequently used in pcc production. The temperature may be controlled to be in the range 5° C. to 95° C., especially 40° C. to 80° C.

The mixture which is provided as an output by the first mentioned or second vessel as appropriate may be delivered to a gas/liquid separator to separate the carbon dioxide and other gas from the slaked lime aqueous suspension. The separator may be one of the known gas/liquid separators, eg. a tangential entry separator which separates gas and liquid under centrifugal force and gravity.

The slaked lime aqueous suspension separated by the separator may be delivered to a storage or buffer tank.

The slaked lime aqueous suspension separated by the separator may be recirculated in a recirculation loop, eg. by a pump which pumps the suspension along a line from the tank, to form an input to the first mentioned vessel or the second vessel as described hereinbefore.

Where a recirculation loop is employed to recirculate slaked lime suspension separated from carbon dioxide and other gas to one of the vessels in which incoming calcium oxide is slaked, one or more properties of the recirculating suspension may be measured on-line. The temperature and solids concentration of the slaked lime may for example be measured. The slaked lime may be admitted into an outlet conduit from the recirculation loop only when the solids level and temperature have reached predetermined values, eg. by opening a valve allowing the slaked lime to exit into the outlet conduit. Such opening may be carried out automatically as described hereinafter.

The use of a recirculation loop conveniently allows the process conditions to be adjusted to set the concentration and temperature of the recirculating suspension to required values so that the suspension when delivered as an output has these required properties.

The slaked lime aqueous suspension separated by the separator may be recirculated via a heat exchanger in a further recirculation loop to the output of the gas/liquid separator, eg. to form an input to the storage or buffer tank. Such a further recirculation loop allows the temperature of the suspension to be adjusted by heating or cooling as appropriate at the heat exchanger.

The temperature of the suspension in the recirculation loop to the storage or buffer tank may advantageously be controlled, eg. to be in the range 40° C. to 80° C. to ensure that quicklime being slaked in the vessel is not water-burned and does not thereby produce a gritty product. The temperature control may be effected by use of a heat exchanger.

The aqueous suspension of slaked lime separated from carbon dioxide and other gas by the separator, eg. after onward delivery from the buffer tank, may be delivered via an output conduit, which may extend from the first mentioned recirculation loop, to a reactor in which it may be employed to produce an aqueous suspension comprising calcium carbonate precipitate, optionally together with other material, eg. entrained solid particulate and/or microfibrous matter, by reacting the slaked lime with carbon dioxide. The reaction may be carried out in a manner well known to those skilled in the pcc art. The carbon dioxide employed in this reaction may be that extracted from the gas/liquid separator earlier in the process. Slaked lime and carbon dioxide may be delivered to the reactor and reacted together in a continuous, semi-continuous or batch process. The pcc suspension so formed may be used in one of the known ways described hereinafter.

Preferably, the calcining furnace employed in the method according to the present invention is one in which particles of calcium carbonate may be flash calcined, eg. heated by an extremely rapid heat transfer process, at a controlled temperature. For example, the particles may be heated to produce decomposition in a residence time of from 0.1 to 5 seconds in an atmosphere in a temperature controlled to be in the range 800° C. to 1100° C. especially 950° C. to 1000° C.

The size of the calcium carbonate particles employed as feed material is not critical although heat transfer to the particles in the calcining furnace will be easier as the size of the particles in reduced. Desirably, the particles have a size which is generally less than 100 $\mu$m, eg. particles of 53 $\mu$m or less which pass through a 300 mesh screen are convenient although particles having sizes from 100 $\mu$m to 1 mm, especially 100 $\mu$m to 500 $\mu$m may be utilised. The particles may be fed into the furnace dispersed in a gas flow, eg. air. The rate at which the gaseous particulate suspension is fed through the furnace may be in the range 100 to 1000 kg per hour per m$^3$ of reactor volume (expressed in terms of oxide production rate).

By calcining particles of calcium carbonate in the manner described, calcium oxide having a desired particle size and quality may be produced. Undesirable over-calcining or under-calcining of the calcium carbonate may be avoided by control of the calcination process conditions.

The calcination furnace in which calcination of calcium carbonate is carried out in the method according to the present invention may conveniently be of the toroidal fluid flow kind in which a toroidal flow heating zone is established and particles to be calcined are injected into the heating zone. Furnaces of the toroidal fluid flow kind are known per se. Such furnaces are described for example in U.S. Pat. No. 4,479,920. Generally, a hot gas is passed through gaps between angled blades or vanes in a ring of blades or vanes provided in the operational chamber of the furnace. The blade ring is formed in an annular gap between the wall of the chamber and a central block, eg. an upwardly pointing conical portion, located on the axis of the chamber. Gas flow is caused to follow a rotary path in a doughnut shaped region around the block and in individual swirls within the rotary path. This ensures efficient heat transfer to material, eg. particulate material, to be heated in the gas flow.

Where a furnace of the toroidal fluid flow kind is employed the rapid heat transfer to the particulate material and also rapid removal of diffusing $CO_2$ produced by the thermal decomposition are reaction rate determining steps which favour rapid reaction and therefore rapid throughput.

The delivery of mineral particles into the toroidal fluid flow is preferably carried out by injection of the particles dispersed from one another. This ensures that the particles are not in contact with one another when they are heated in the toroidal fluid flow. Such contact can cause fluxing and fusing of particles and leads to a product which can be abrasive. Such abrasiveness is undesirable in subsequent processing of the material.

The carrier fluid may comprise a gas such as air or inert gas which may be initially blown over a source of the particles to be suspended in it or to which the particles may be added to carry them into the furnace. The carrier fluid may be at ambient temperature eg. 20° C. although it could if required be heated. In general, the carrier gas temperature is not critical.

The present invention provides a method for the production of a slaked lime slurry which method may provide or form part of a continuous process for slaked lime supply. Beneficially, the present invention allows the slaked lime slurry to be produced efficiently with a controlled lime particle size and concentration, controlled lime quality and controlled slaked lime molarity and temperature. Slaked lime may be produced which contains no grit as produced in the prior art and therefore time consuming and costly grit separation processes may be avoided.

Since calcium oxide produced by the calcination process is converted directly into slaked lime the problems in the prior art associated with handling of dry calcium oxide may be avoided.

Slaked lime suspensions may be produced by the method according to the present invention which are not too viscous, ie. which are flowable and pumpable. The calcium hydroxide particles in such a suspension may, where high solids loadings are required, advantageously be dispersed using a dispersing agent as described in our copending UK patent application No. GB 9624085.

Embodiments of the present invention will now be described by way of example with reference to the accompanying drawing in which:

DESCRIPTION OF AN EMBODIMENT OF THE INVENTION

Figure 1:
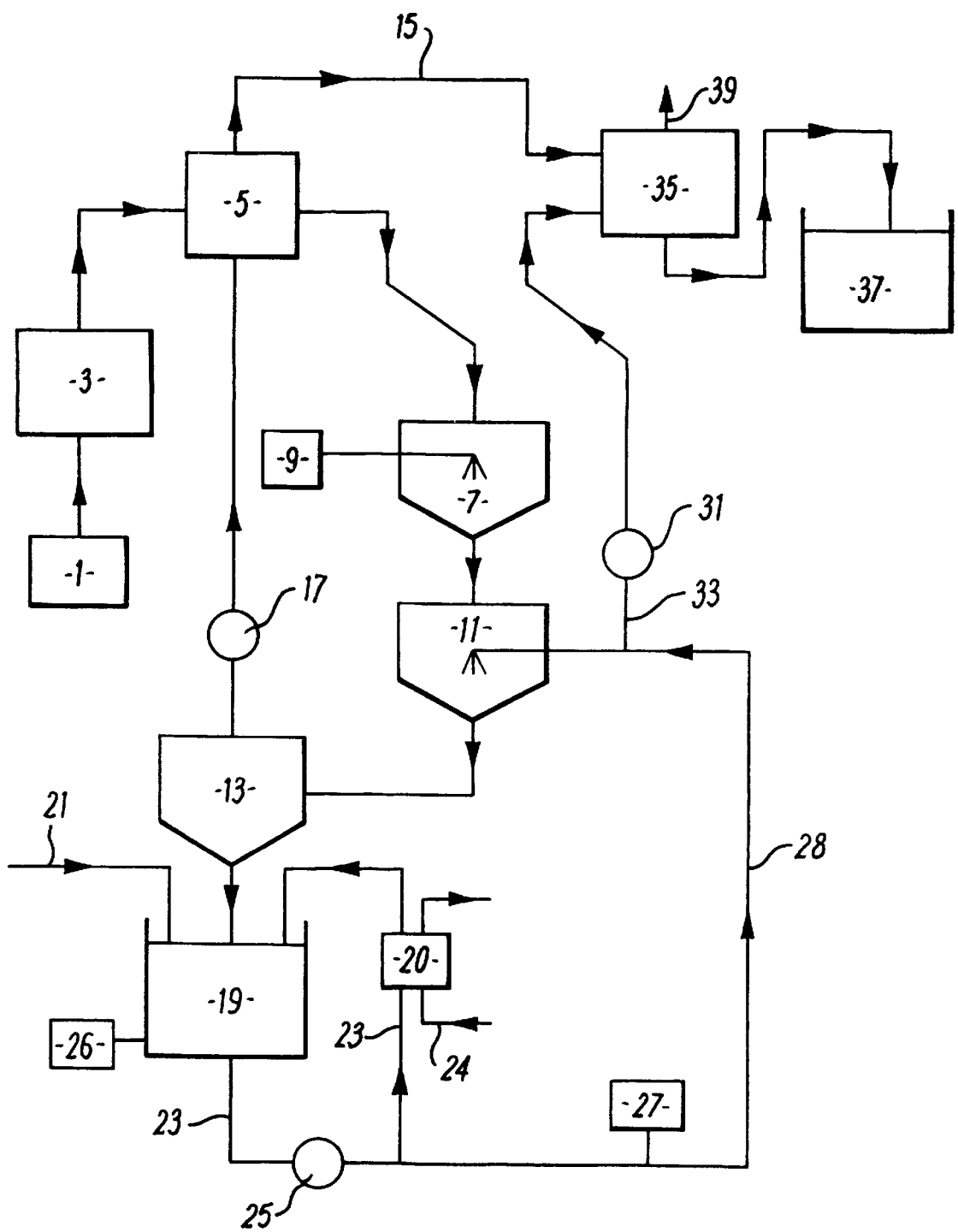
FIG. 1 is a diagrammatic flow sheet of a process embodying the invention.

As shown in FIG. 1, a flow of air carrying particles of calcium carbonate obtained from a mineral source, eg. limestone, is formed in a feeder 1 as an input to a flash calciner 3 in which the calcium carbonate rapidly undergoes thermal decomposition. The temperature in the flash calciner 3 is about 950° C. to 1000° C. Output from the calciner 3 consists of the products of the decomposition and comprises a suspension of calcium oxide particles in a gaseous flow comprising carbon dioxide and other gases including oxygen, nitrogen and water vapour. The gaseous flow is passed through a heat exchanger 5 in which the temperature of the output suspension is rapidly reduced by a temperature differential of about 100° C. The output suspension emerging from the heat exchanger 5 is passed into a first venturi-type scrubber 7 in which water from a source 9 is sprayed into a flow of the suspension. The temperature of the flow is reduced to about 85° C. by quenching in the water. The mixed liquid and gaseous suspension formed in the scrubber 7 is then passed into a second venturi-type scrubber 11 in which an already formed aqueous suspension of calcium hydroxide is sprayed into the treated suspension supplied from the first scrubber 7. The output from the second scrubber 11 is fed to a gas/liquid separator 13 which produces a gaseous carbon dioxide-containing output which is delivered via the heat exchanger 5 to an output line 15 with the assistance of a fan 17. The liquid separated by the separator 13 comprising an aqueous suspension of calcium hydroxide is delivered to a buffer tank 19 where it may be diluted with water via a line 21 to give an appropriate solids concentration in the suspension. Suspension in the tank 19 is pumped by a pump 25 through a circuital line 23 which returns the suspension via a heat exchanger 20 of the plate and frame type to the buffer tank 19. Water passing via line 24 through the heat exchanger 20 can heat or cool the suspension in the line 23 as appropriate and can thereby rapidly adjust the temperature of the suspension in the buffer tank 19 which may be monitored by a temperature monitor 26. Suspension is pumped via a second recirculation loop 28 to the second scrubber 11. One or more properties of the suspension circulating through the loop 28, eg. the temperature and molarity of the suspension, may be monitored by known on-line monitors 27. When the circulating suspension has the appropriate properties, eg. temperature and molarity, a valve 31 in an exit line 33 is opened. The opening may be carried out in a known way by a control loop (not shown) using a control signal obtained by comparing the measurements made by the monitors 27 with a required measurement values. Output from the loop 28 in the form of calcium hydroxide slurry is delivered via the line 33 to a reactor 35 in which the slurry is carbonated by input of carbon dioxide-containing gas supplied via the line 15. An aqueous slurry containing precipitated calcium carbonate produced in the reactor 35 is delivered to a buffer tank 37 where it is stored and subsequently delivered for use in a known manner, eg. in production of a composition for paper making or paper coating or as a filler, pigment or extender in a paint, polymer or other known particulate containing medium.

Unreacted carbon dioxide containing gas is allowed to leave the reactor 35 via an outlet 39 and may be vented as exhaust to the outside atmosphere.

We claim:

1. A method of producing an aqueous suspension of calcium hydroxide which comprises passing a gaseous flow incorporating particles of calcium carbonate through a calcining furnace to thermally decompose the calcium carbonate and produce a gas comprising decomposition products including carbon dioxide and having calcium oxide particles suspended therein, delivering a flow of said gas comprising said decomposition products and having said calcium oxide particles suspended in said carbon dioxide as a carrier gas, without further separation of said decomposition products, to a vessel wherein the calcium oxide particles are contacted with sprayed water to produce a flow of calcium hydroxide suspended in the carrier gas, delivering the flow of calcium hydroxide to a gas/liquid separator, and separating the calcium hydroxide from the carrier gas in the separator.

2. A method as claimed in claim 1 and wherein said gas comprising said decomposition products and having said calcium oxide particles suspended therein is cooled before being supplied to the said vessel.

3. A method as claimed in claim 1 and wherein the said vessel comprises a scrubber wherein flowing water in a spray is contacted with the particles in the gaseous flow.

4. A method as claimed in claim 3 and wherein the scrubber includes a venturi nozzle which permits suction and swirling of the gaseous flow and intimate contacting of the calcium oxide particles in the gaseous flow by the water.

5. A method as claimed in claim 1 and wherein the temperature of the flow of decomposition products is reduced in the said vessel below the boiling point of water in the vessel to avoid drying of the calcium oxide particles.

6. A method as claimed in claim 1 and wherein the calcium hydroxide suspended in the carrier gas formed in the said vessel is passed to a second vessel wherein the mixture is further contacted with water.

7. A method as claimed in claim 6 and wherein the second vessel comprises a scrubber including a venturi throat.

8. A method as claimed in claim 6 and wherein the water added in the second vessel comprises a flow of calcium hydroxide already produced in the method and recirculated as an input to the second vessel.

9. A method as claimed in claim 6 and wherein the calcium hydroxide suspended in the carrier gas is passed through the second vessel in which it is further contacted with water prior to delivery to the gas/liquid separator.

10. A method as claimed in claim 9 and wherein the calcium hydroxide separated by the gas/liquid separator is recirculated via a recirculation loop to the said second vessel and wherein one or more properties of the calcium hydroxide in the recirculation loop is monitored and/or controlled.

11. A method as claimed in claim 10 and wherein the calcium hydroxide is delivered via an output line from the recirculation loop to a reactor in which it is employed to produce a precipitated calcium carbonate by reaction with carbon dioxide.

12. A method as claimed in claim 11 and wherein the carbon dioxide is contained in a gas extracted earlier in the method.

13. A method as claimed in claim 1 and wherein the temperature of the calcium hydroxide separated by the gas/liquid separator is adjusted by passing the calcium hydroxide through a heat exchanger in a recirculation loop to an output of the gas/liquid separator.

14. A method as claimed in claim 1 and wherein the calcining furnace comprises a flash calciner which comprises a furnace in which a toroidal flow heating zone is established to provide the flash calcining of feed material.

15. A method as claimed in claim 1 and which comprises a continuous or semi-continuous process for the production and slaking of calcium oxide and the direct formation of precipitated calcium carbonate from the slaked lime so produced by reaction with carbon dioxide.

* * * * *